(No Model.)

E. P. SLENTZ.
ROPE OR WIRE HOLDER.

No. 523,292. Patented July 17, 1894.

Witnesses:
J. B. McGirr.
W. J. Clark

Inventor:
Edmund P. Slentz
By Evert & Appleman
Attorneys

UNITED STATES PATENT OFFICE.

EDMUND P. SLENTZ, OF MANSFIELD VALLEY, PENNSYLVANIA.

ROPE OR WIRE HOLDER.

SPECIFICATION forming part of Letters Patent No. 523,292, dated July 17, 1894.

Application filed December 14, 1893. Serial No. 493,690. (No model.)

*To all whom it may concern:*

Be it known that I, EDMUND P. SLENTZ, a citizen of the United States of America, residing at Mansfield Valley, in the county of Allegheny and State of Pennsylvania, have invented certain new and useful Improvements in Rope or Wire Holders, of which the following is a specification, reference being had to the accompanying drawings.

This invention has relation to an improved device for securing clothes-lines to posts without the necessity of tying or looping, and in the manner to be hereinafter described.

This invention has for its object to construct a device as heretofore mentioned that will permit the line to be drawn in any direction from the device irrespective as to the position of the line holder.

This invention has for its still further object the construction of a device that will be strong, durable, and comparatively inexpensive to manufacture; furthermore, one that will be thoroughly efficient in its operation.

The invention consists in various novel details of construction, combination and arrangement of parts to be hereinafter more particularly described and specifically pointed out in the claims.

In describing the invention in detail reference is had to the accompanying drawings, wherein like figures of reference indicate similar parts throughout the several views, in which—

Figure 1:
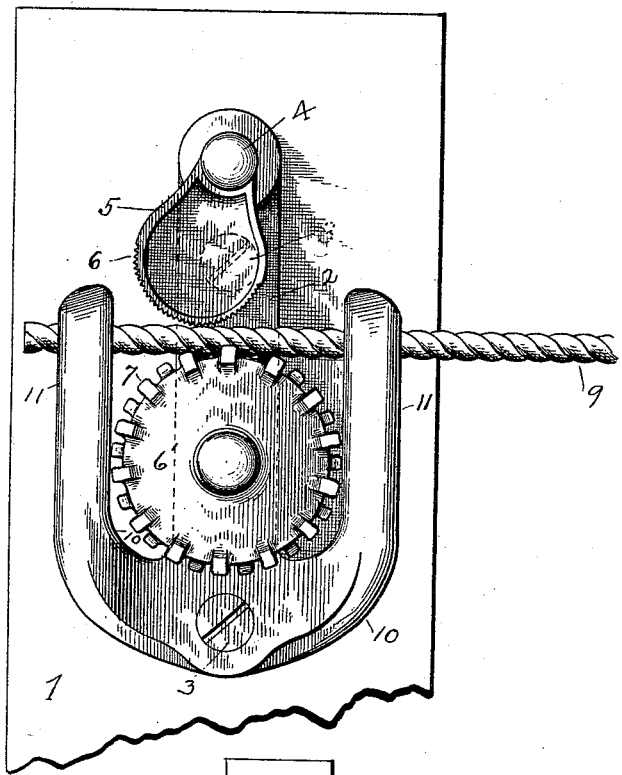
Figure 2:
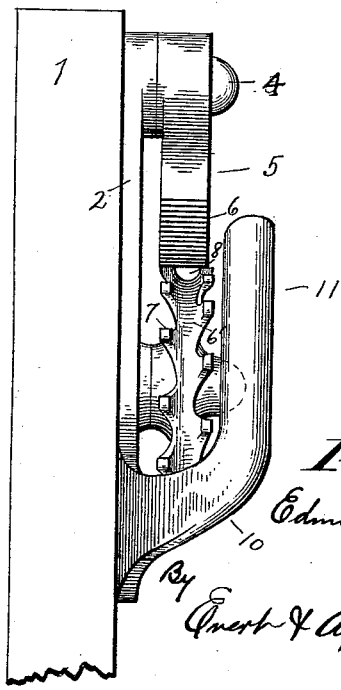

Figure 1, is a front view of my improved clothes line fastener. Fig. 2, is a side view of the same.

In these drawings—1, indicates the post having secured thereto the device in any suitable manner.

2, represents the base or body portion of the device, which is preferably secured to the post by means of screws 3, 3. At the top of said body portion as shown at 4, is pivotally secured a cam 5 having notches 6 forming a semi-circle on its under side. Near the center of the body portion and in alignment with the cam a pulley-wheel 6', is journaled, carrying on its periphery teeth 7, said teeth forming a U shaped annular groove 8, for the reception of the clothes-line 9. The lower body portion of the device is formed into an approximately U shape 10, having upwardly extending arms 11, 11, said arms being arranged to extend beyond the face and to the sides of the wheel as shown in the drawings for the purpose of retaining the line nearly in alignment with the pulley irrespective of the angle of the line from the arms.

The operation of the device is as follows: The end of the line is first secured in place to some convenient object, and the line drawn over the pulley until it is as tight as desired, after which the cam is pressed down, preventing the line from moving when the same is weighted. The teeth of the pulley being arranged on opposite sides of the wheel at intermediate points affords the means of holding the line firm, as will be readily understood. When it is desired to extend the line at different angles, the line will first be brought partially around one of the arms and in this manner the line may be passed from one holder to the other as required. In order to remove the line, the cam is thrown out of engagement with the line, and it may then be easily taken down.

The device may be constructed of any suitable material, but preferably of cast iron or brass, all parts being designed that they may be easily cast in the well known manner.

It will be particularly noted that various changes may be made in the details of construction, yet fall within the spirit of my invention.

Having fully described my invention, what I claim as new, and desire to secure by Letters Patent, is—

In a rope or wire holder, the combination of a base plate carrying a toothed cam, a pulley provided with intermediate teeth on its periphery, a lower U-shaped extremity having upwardly extending arms, said arms being arranged in front of and to the sides of said pulley for the purpose of retaining the line nearly in alignment with the pulley irrespective of the angle of the line, substantially as described.

In testimony whereof I affix my signature in presence of two witnesses.

EDMUND P. SLENTZ.

Witnesses:
H. C. EVERT,
FRED SCHUMACHER.